Patented Jan. 16, 1945

2,367,455

UNITED STATES PATENT OFFICE 2,367,455

AMINOCYANOACETAMIDE RESINS

Louis H. Bock, Huntingdon Valley, and Alva L. Houk, Philadelphia, Pa., assignors to Röhm & Haas Company, Philadelphia, Pa., a corporation of Delaware No Drawing. Application April 9, 1941,
Serial No. 387,678

4 Claims. (Cl. 260—72)

This invention relates to the reaction products of formaldehyde and aminoamides of cyanoacetic acid.

It has been found that formaldehyde and aminoamides of cyanoacetic acid react to give condensation products and resins which are useful in improving textile fibers.

Formaldehyde may be used in the form of an aqueous solution, a solution in an organic solvent such as alcohol, or a solid polymer, such as paraformaldehyde. While one mol of formaldehyde per mol of amide appears to be theoretically required, somewhat smaller or larger proportions of formaldehyde are effective. Larger proportions are desirable to increase the final insolubility of the resin. Any tendency of excess formaldehyde to cause a premature gelation of the condensate can be controlled by addition of a primary or secondary amine, that is, one having at least one reactive hydrogen on the amine nitrogen.

While the addition of a reactive amine may alter the nature of the primary addition products or condensates, the final resins have the same properties. Suitable amines for controlling the reaction of formaldehyde and an aminocyanoacetamide include secondary amines such as dimethylamine, diethylamine, dioctylamine, caprylmethylamine, dicyclohexylamine, cyclohexylmethylamine, etc. and primary amines such as methylamine, ethylamine, allylamine, aniline, cyclohexylamine, etc. and also the alkylene polyamines which yield the aminocyanoacetamides.

In place of a free reactive amine there may be used a condensation product of a primary or secondary amine and formaldehyde. As is known, these materials give products such as bis-(dimethylamino) methane and hexahydro trimethyl-1,3,5-s-triazine. These compounds supply not only the controlling amine but also up to half of the formaldehyde requirements.

The aminocyanoacetamides, which are reacted with formaldehyde, are obtainable by reacting cyanoacetic acid or an ester or simple amide thereof with an alkylene polyamine. Preferred esters are the methyl, ethyl, or propyl esters, which yield readily volatile alcohols but other esters are also effective. Typical of the polyamines which may be reacted with the acid, ester or amide are ethylene diamine, diethylene triamine, triethylene tetramine, and other polyamines of this series as well as mixtures of these amines, tripropylene tetramine, N,N'-bis(aminopropyl)ethylene diamine, propylene diamine, pentamethylene diamine, etc. From one to two mols of such amine may be reacted with one to two mols of cyanoacetate.

The ester or amide and polyamine are mixed directly or in suitable solvent, such as alcohol or dioxane. While the reaction begins at room temperature, it is usually convenient to accelerate it by heating the reaction mixture. The water, alcohol or ammonia formed in the reaction may be driven off under normal or reduced pressure.

The resulting products have the general formula

$NCCH_2CONHX(NHY)_nNH_2$ wherein X and Y represent alkylene groups of at least two carbon atoms each and $n$ has a value from zero to 6.

In forming the reaction products of aminocyanoacetamides and formaldehyde the reactants are mixed directly or in a solvent. The mixture is stirred and heated above room temperature but below 100° C. to complete the reaction. The primary condensates are soluble in water, alcohol, dioxane, and similar solvents. If the reaction is performed in a solvent, the solvent may be evaporated to concentrate or isolate the condensate. When it is further heated at temperatures above 100° C., the primary reaction product is converted into an insoluble resin.

The following example is illustrative of the preparation of the condensates and resins described above.

20.6 parts of diethylene triamine was added to 22.6 parts of ethyl cyanoacetate. An exothermic reaction ensued with the mixture becoming very warm. After the mixture had been stirred for an hour, the mixture was heated in an oil bath at 130–140° C. Ethyl alcohol vaporized from the mixture, leaving a viscous, yellow syrup.

The syrup was taken up in 40 parts of water and 20 parts of a 30% aqueous formaldehyde solution added thereto. The mixture was heated to 80° C. and maintained at this temperature for one hour with continuous stirring.

Enough water was added to part of this reaction product to yield a 20% solution of the reaction product. The solution was treated with hydrochloric acid until a pH of 6.8 was reached. A piece of rayon taffeta was soaked in this solution for five minutes while the temperature was held at 70° C. The fabric was then dried, heated for one-half hour in an oven at 130° C., and washed in a warm soap solution. The taffeta was then dyed in a bath of Acid Brown EW #3 to a medium shade of brown. The color was well retained on washing.

Another part of the reaction product was neutralized with hydrochloric acid and dissolved in sufficient water to give a 40% solution. The solution was spread in a thick film on a glass plate, which was dried overnight. The plate was then baked at 130° C. for about 45 minutes. The cured film was clear, brittle, and insoluble in water, dilute acids, or organic solvents.

The formaldehyde-aminocyanoacetamide condensate may be mixed with other resin-forming condensates, such as phenol-formaldehyde, urea-formaldehyde, triazine-formaldehyde, sulfonamide formaldehyde, etc. to give products of distinct and valuable properties. The formaldehyde-aminocyanoacetamide condensates and resins may also be formed in conjunction with these other condensates or resins to give cross-polymers. The aminocyanoacetamide resins have the capacity of absorbing acidic constituents and are, therefore, useful in the purification and absorption of gases and the purification of liquids.

We claim:

1. The process of preparing resinous condensates which comprises reacting by heating formaldehyde and an aminocyanoacetamide of the formula $$NCCH_2CONHX(NHY)_nNH_2$$

wherein X and Y represent alkylene groups of two to five carbon atoms each and $n$ has a value up to 6 inclusive.

2. The process of preparing resinous condensates which comprises reacting by heating a mixture containing formaldehyde and N-aminoethyl-aminoethyl cyanoacetamide.

3. As a new composition of matter the reaction product of formaldehyde and an aminocyanoacetamide of the formula $$NCCH_2CONHX(NHY)_nNH_2$$

wherein X and Y represent alkylene groups of two to five carbon atoms each and $n$ has a value up to 6 inclusive.

4. As a new composition of matter the reaction product of formaldehyde and N-aminoethyl-aminoethyl cyanoacetamide.

LOUIS H. BOCK.
ALVA L. HOUK.